(12) United States Patent
Nichols et al.

(10) Patent No.: US 7,353,282 B2
(45) Date of Patent: Apr. 1, 2008

(54) METHODS AND SYSTEMS FOR SHARING A NETWORK RESOURCE WITH A USER WITHOUT CURRENT ACCESS

(75) Inventors: Isaac Nichols, Kirkland, WA (US);
Ashok Kuppusamy, Seattle, WA (US);
Thomas Olsen, Issaquah, WA (US);
Ricard Roma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 10/304,187

(22) Filed: Nov. 25, 2002

(65) Prior Publication Data

US 2004/0103203 A1 May 27, 2004

(51) Int. Cl.
*G06F 15/16* (2006.01)
(52) U.S. Cl. .................. 709/229; 709/203; 709/217; 709/223; 713/151; 713/168; 713/182
(58) Field of Classification Search ........... 709/203, 709/217, 219, 223, 224, 225, 229; 707/9–10; 713/151, 168, 182
See application file for complete search history.

(56) References Cited

U.S. PATENT DOCUMENTS

| | | | | |
|---|---|---|---|---|
| 5,586,260 | A * | 12/1996 | Hu ............................. | 726/12 |
| 5,941,947 | A * | 8/1999 | Brown et al. ............... | 709/225 |
| 6,055,637 | A * | 4/2000 | Hudson et al. .............. | 726/20 |
| 6,067,623 | A * | 5/2000 | Blakley et al. .............. | 726/5 |
| 6,092,196 | A * | 7/2000 | Reiche ......................... | 726/6 |
| 6,182,227 | B1 * | 1/2001 | Blair et al. .................. | 726/5 |
| 6,212,640 | B1 | 4/2001 | Abdelnur et al. ........... | 713/201 |
| 6,279,111 | B1 * | 8/2001 | Jensenworth et al. ...... | 726/10 |
| 6,463,474 | B1 * | 10/2002 | Fuh et al. .................... | 709/225 |
| 6,490,624 | B1 * | 12/2002 | Sampson et al. ........... | 709/227 |
| 6,678,731 | B1 * | 1/2004 | Howard et al. ............. | 709/225 |
| 7,054,944 | B2 * | 5/2006 | Tang et al. .................. | 709/229 |
| 7,117,366 | B2 * | 10/2006 | Vincent ....................... | 713/176 |

FOREIGN PATENT DOCUMENTS

EP    1 089 516 A2    4/2001

OTHER PUBLICATIONS

International Business Machines Corporation, "Servlet/Applet/HTML Authentication Process With Single Sign-On", Research Disclosure, Kenneth Mason Publications, Hampshire, GB, vol. 429, No. 128, Jan. 2000, XP007125413, ISSN: 0374-4353.

* cited by examiner

*Primary Examiner*—LaShonda Jacobs
(74) *Attorney, Agent, or Firm*—Merchant & Gould P.C.; Ryan T. Grace (57) ABSTRACT

Methods and systems provide for sharing of a network resource that requires an authentication ID for access with a user not currently having an authentication ID. A placeholder is generated in an access list providing authorization for the network resource and the placeholder is associated with a known identifier of the user. Upon the user obtaining an authentication ID and attempting to access the network resource, the authentication ID for the user is stored in the placeholder to establish authorization for the user to the network resource. Several checks may be made prior to storing the authentication ID within the placeholder, including determining whether the user has verified obtaining the authentication ID with the issuer, determining whether the authentication ID of the user attempting access matches the authentication ID the issuer has provided for the user, and determining whether the known identifier stored in the placeholder matches a sign-in provided by the user.

26 Claims, 6 Drawing Sheets

METHODS AND SYSTEMS FOR SHARING A NETWORK RESOURCE WITH A USER WITHOUT CURRENT ACCESS

TECHNICAL FIELD

The present invention is related to sharing network resources with users of the network. More particularly, the present invention is related to sharing network resources with guest users who do not currently have access to the network resources.

BACKGROUND

Network resources such as data files, web pages, and collaboration tools may be provided on a computer network so that multiple users can access the resources through the network. Typically, the network resources are provided at a network location through a server computer that can be accessed by the client computers of users. These users may post a network resource at the network location for access by the other users. However, such sharing of network resources often calls for security measures to prevent unauthorized access to the network resources.

To prevent unauthorized access, network locations such as sites on the world wide web utilize authentication and authorization techniques when users attempt to access the network resource. Authentication techniques may be of various forms, such as requiring entry of a user name and password for each network site containing a network resource. To improve the practicality of authentication, a centralized authentication service such as .NET™ Passport™ may be used to require the user to log in with a user name and password once at the authentication ID server to obtain one or more computer cookies with an authentication ID. The authentication ID of the cookie is then checked at various network locations when the user attempts to access network resources rather than requiring the user to again enter a user name and password to be authenticated.

Once the user has been authenticated, the authenticated identity of the user is then compared to an access list to determine whether the user has authorization to access a particular network resource. Thus, the access list has permissions associated with the authentication ID of each user who has been given some authorization. When the access list gives authorization to the user for a network resource, the user is then given access to the resource. If the access list does not provide authorization for a network resource to a user, that user is denied access to the resource.

One user who has access to a network resource, such as one who posted the resource to the network, may wish to share the resource with a guest user. Access to this resource may require authentication by obtaining an authentication ID from the authentication ID server. However, the user wishing to share the resource may not know whether the guest user has an account with the authentication ID server. If the guest user does not have an account, then access cannot be granted to the network resource for this guest user. Furthermore, the user wishing to share the network resource cannot proceed to set up authorization for the guest user in the access list since the guest user does not have an authentication ID account that can be referenced in the access list.

SUMMARY

Embodiments of the present invention address these and other problems by providing a placeholder in the access list for the guest user. The placeholder is associated with a known identifier of the guest user that is known by the user wishing to share the network resource. The guest user obtains an authentication ID account and the authentication ID for the guest user can then be inserted into the placeholder associated with the known identifier of the guest user. The placeholder in the access list for the guest user allows the user wishing to share the resource to proceed in setting up authorization for the guest user without regard to whether the guest user has an authentication ID. Upon the guest user obtaining an authentication ID, the guest user can be authenticated and given authorization to access the network resource.

One embodiment is a method of sharing a network resource with a user not currently having access to the network resource. The method involves generating a placeholder for the user in an access list for the network resource, wherein the placeholder contains the known identifier. The user is instructed to obtain an authentication identifier associated with the known identifier. The authentication identifier associated with the known identifier is obtained from an issuer of authentication identifiers at the computer of the user in response to receiving the instruction. The authentication identifier associated with the known identifier is obtained from the computer of the user upon an attempt by the user to access the network resource, and a copy of the authentication identifier obtained from the computer of the user is stored in the placeholder that contains the known identifier within the access list.

Another embodiment is a computer system for sharing a network resource with a user not currently having access to the network resource. The computer system includes storage containing an access list for the network resource and a network interface. A processing device is configured to generate a placeholder within the network resource that contains the known identifier and generate a message through the network interface to the user instructing the user to obtain an authentication identifier. The processor is also configured to obtain the authentication identifier through the network interface from a computer of the user upon the user attempting to access the network resource and store the authentication identifier in the placeholder containing the known identifier within the storage.

Another embodiment is a network system for sharing a network resource with a user not currently having access to the network resource. A first server computer provides the network resource and maintains an access list providing permissions for the network resource. The first server generates a placeholder within the access list, stores a known identifier of the user in the placeholder, and sends a message to the known identifier instructing the user to obtain an authentication identifier. The first server also obtains the authentication identifier upon an attempt by the user to access the network resource and stores the authentication identifier within the placeholder containing the known identifier. A client computer receives the message for the known identifier, obtains an authentication identifier associated with the known identifier from an issuer, and attempts to access the network resource at the first server after obtaining the authentication identifier.

Another embodiment is a computer readable medium comprising instructions that when executed by a computer perform several steps. A placeholder storing a known identifier of a user is generated in storage. Upon receiving an attempt by the user to access a network resource, it is detected whether an authentication identifier being provided by the user has been verified with an issuer of the authentication identifier. An authentication identifier of the issuer that is associated with the known identifier of the user is compared with the authentication identifier being provided by the user, and the known identifier of the user is compared to the known identifier in the placeholder. When the authentication identifier being provided by the user has been verified with the issuer and matches the authentication identifier of the issuer that is associated with the known identifier of the user, and when the known identifier of the user matches the known identifier in the placeholder, then the authentication identifier is stored in the placeholder.

DETAILED DESCRIPTION

Embodiments of the present invention provide access to network resources for guest users who do not currently have access because they lack an authentication ID. A placeholder associated with a known identifier for the guest user is generated within an access list and permissions to network resources may be assigned to the placeholder in the access list even though the guest user has not yet obtained the authentication ID. An invitation is provided to the user to request that the user obtain an authentication ID. The authentication ID is stored in the placeholder upon the user obtaining the authentication ID and attempting to access the network resource, and the authentication ID is later used to provide authorization for the user attempting to access the network resource.

Figure 1:
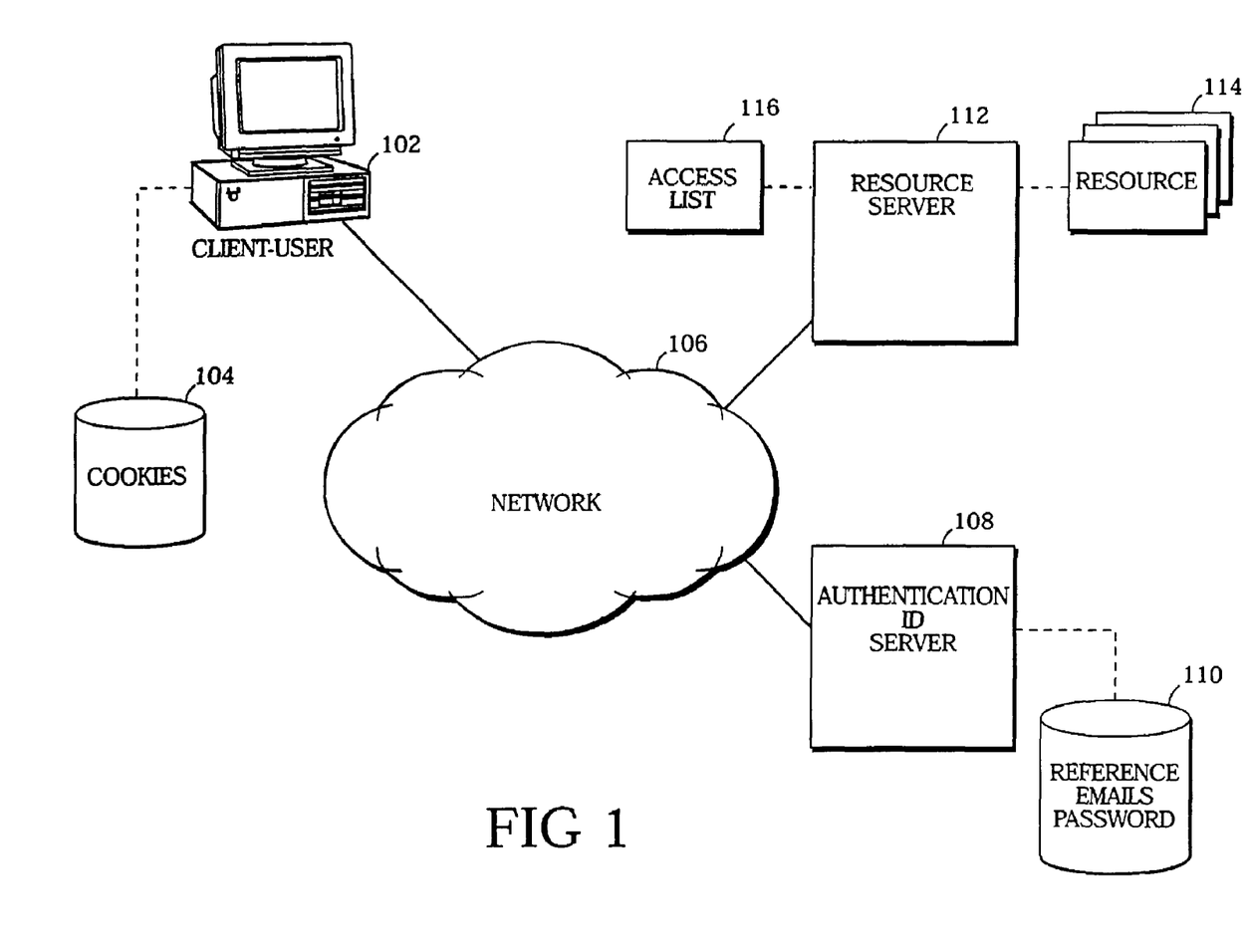
FIG. 1 illustrates a networked operating environment for embodiments of the present invention.

FIG. 1 shows a networked operating environment where embodiments of the present invention may be implemented. This environment includes a client computer 102 linked to a network 106 such as a local area network, wide area network, or the global Internet. The guest user who initially lacks access to particular network resources due to lack of an authentication ID operates the client computer 102. The client computer 102 has storage 104, such as a hard disk drive, where cookies may be contained.

Various server computers are also linked to the network 106 such as an authentication ID server 108. An issuer of authentication IDs operates the authentication ID server 108 to provide authentication accounts for users. The account allows the user to log in to the authentication server 108 with log in credentials known to the user and then receive cookies containing an authentication ID that authenticates the user for visits to various other network locations.

The client computer 102 may log into the authentication server 108 to obtain an account and begin receiving authentication IDs upon providing log in credentials including a known identifier and password. The known identifier may be of various forms but is an identifier for the user that is known to others such as an email address, telephone number, or instant messaging ID. During log in, the authentication ID server 108 compares the entered credentials to stored credentials that the authentication ID server 108 maintains in a reference store 110. Upon finding matching credentials, the authentication ID server 108 issues the cookies with the authentication ID to the user and makes the authentication ID available to other servers linked to the network 106. The client computer 102 then saves the cookies in the cookie container 104 for later access by the network locations where the client computer 102 may attempt to access.

A resources server 112 is linked to the network 106 and provides various resources 114 to client computers 102 that access the network location established by the resource server 112. The resources may include various directories of an Internet domain where the client computer 102 may access stored information and/or where the client computer 102 may post information for access by others. However, the resources server 112 may provide security for the resources 114 to prevent unauthorized users from accessing private information.

To prevent unauthorized access, the resource server 112 maintains an access list 116 that contains permissions for the resources 114 that are associated with authentication IDs as provided by the authentication server 108. When a user attempts to log in to the resource server 112, the resource server 112 may perform an authentication process. In this process, the server 112 searches the client computer 102 to find a non-expired cookie relevant to the network location of the resource server 112. The authentication ID of the cookie is compared to an authentication ID provided to the resource server 112 from the authentication server 108, and a matching authentication ID results in the server 112 authenticating the user.

After having authenticated the user, the resource server 112 references the access list 116 to determine the permissions available for the user with the authentication ID that has been checked. The permissions define which resources 114 that the authenticated user may access. These permissions may be set by the administrator of the resource server 112 and/or by users who own the various resources 114. The permissions may be set without regard for whether a guest user who is to be given access to a resource 114 already has an authentication ID so that the individual setting the permissions need not first verify that the guest user has an authentication ID.

To allow a guest user who currently lacks an authentication ID to access the network resources 114, the resource server 112 generates a placeholder within the access list and stores a known identifier known for the guest user in the placeholder. The place holder is a normal entry within the access list 116 but contains the known identifier rather than the authentication ID. The known identifier is provided by the individual wishing to set permissions for the guest user to share the resource 114.

The guest user is then invited to access the resource 114 by instructing the guest user to first obtain an authentication ID that uses the known identifier used in the placeholder as the log in name for the authentication ID. The instruction may be sent as an email or other message type from the resource server 112 to an email address or other known identifier of the guest user. The email may contain a hyperlink to the authentication ID server 108 as well as a hyperlink back to the resources server where the resource 114 can be accessed. Upon the guest user obtaining an authentication ID account and accessing the network resource, the resources server 112 may perform several checks as discussed in more detail below with reference to FIGS. 3 and 4. Upon the resources server 112 performing the checks for the guest user, the resources server 112 stores the authentication ID of the guest user in the placeholder within the access list 116 and gives the guest user access to the requested resource 114.

Figure 2:
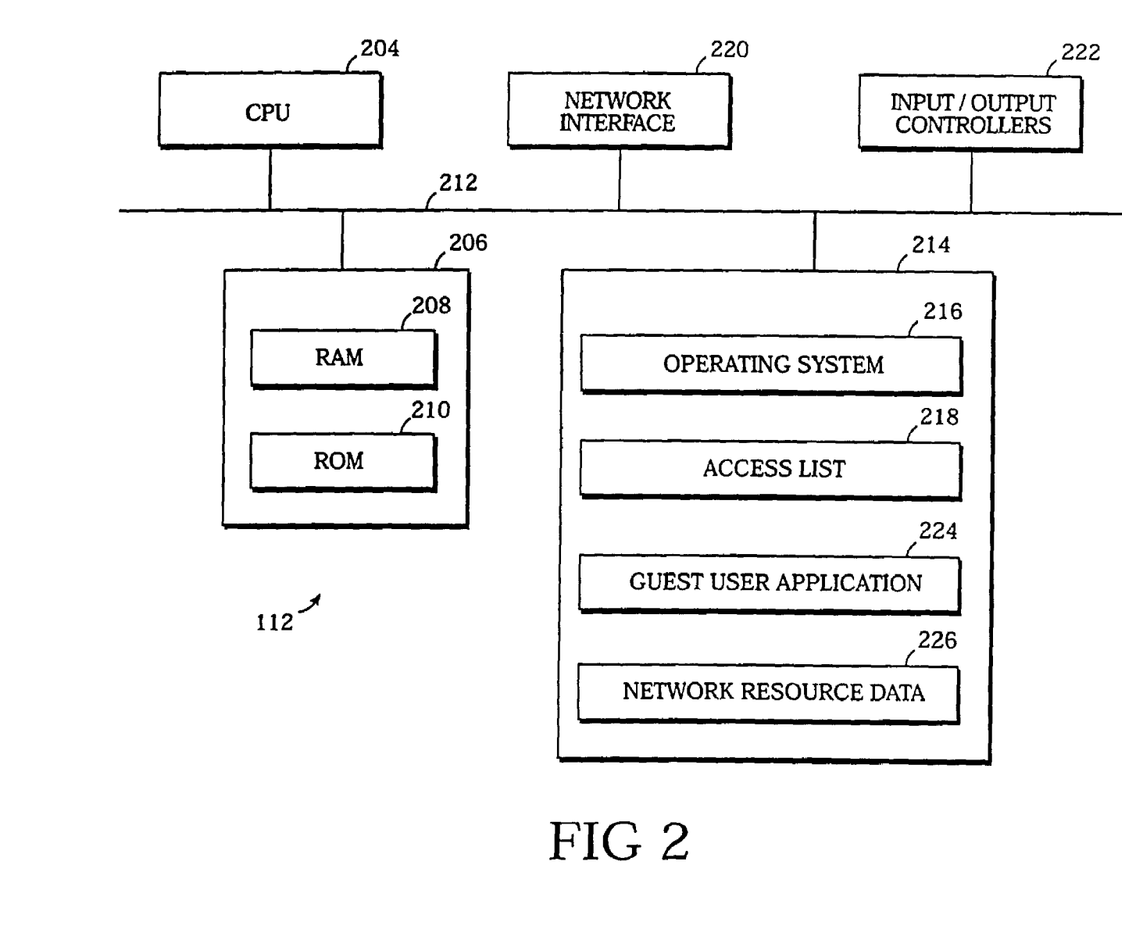
FIG. 2 illustrates the components of the resource server computer of FIG. 1 according to one embodiment of the present invention.

FIG. 2 and the following discussion are intended to provide a brief, general description of a suitable computing environment in which the invention may be implemented in a server computer 112. While the invention will be described in the general context of program modules that execute in conjunction with application programs that run on an operating system on the server computer 112, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the resource server computer 112 of FIG. 1 may also be practiced in distributed computing environments where tasks are performed by remote processing devices that are linked through a communications network rather than in a single server computer. In a distributed computing environment, program modules may be located in both local and remote memory storage devices.

FIG. 2 shows an illustrative computer architecture for the server computer 112 for practicing the various embodiments of the invention. The computer architecture shown in FIG. 2 illustrates a conventional server computer, including a central processing unit 204 ("CPU"), a system memory 206, including a random access memory 208 ("RAM") and a read-only memory ("ROM") 210, and a system bus 212 that couples the memory to the CPU 204. A basic input/output system containing the basic routines that help to transfer information between elements within the computer, such as during startup, is stored in the ROM 210. The server computer 112 further includes a mass storage device 214 for storing an operating system 216, access list 218, and application programs. The mass storage device 214 also stores a guest user application 224 that allows the guest user to be added to the access list 218 and may also store network resource data 226 that the guest user wishes to access.

The mass storage device 214 is connected to the CPU 204 through a mass storage controller (not shown) connected to the bus 212. The mass storage device 214 and its associated computer-readable media, provide non-volatile storage for the server computer 112. Although the description of computer-readable media contained herein refers to a mass storage device, such as a hard disk or CD-ROM drive, it should be appreciated by those skilled in the art that computer-readable media can be any available media that can be accessed by the server computer 112.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the server computer 112 operates in a networked environment using logical connections to remote computers through the network 106, such as the Internet. The server computer 112 may connect to the network 106 through a network interface unit 220 connected to the bus 212. It should be appreciated that the network interface unit 220 may also be utilized to connect to other types of networks and remote computer systems. The server computer 112 may also include an input/output controller 222 for receiving and processing input from a number of devices, including a keyboard or mouse (not shown). Similarly, an input/output controller 222 may provide output to a display screen, a printer, or other type of output device.

As mentioned briefly above, a number of program modules and data files may be stored in the mass storage device 214 and RAM 208 of the server computer 112, including an operating system 216 suitable for controlling the operation of a networked server computer. The mass storage device 214 and RAM 208 may also store one or more application programs such as the guest user application 224.

Embodiments of the present invention provide program modules for use in conjunction with the guest user application program 224. The program modules implement logical operations to provide access to the network resource for the guest user. Various embodiments of the logical operations of the program modules for the guest user application program 224 are discussed below with reference to FIGS. 3 and 4. Additionally, various embodiments of logical operations that are performed within the network environment of FIG. 1 to establish interaction between the client computer 102, authentication ID server 108, and resources server 112 are discussed below with reference to FIGS. 5 and 6.

Figure 3:
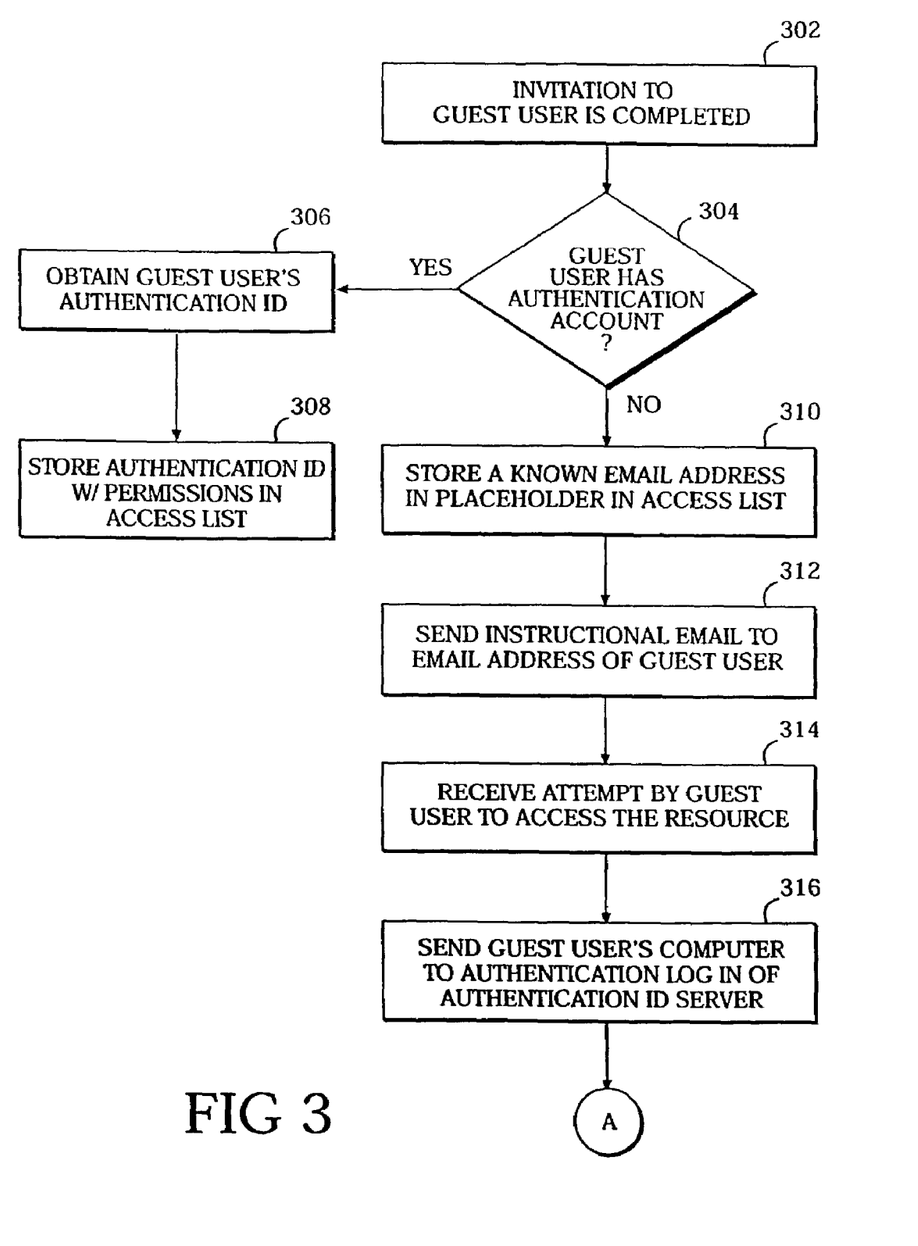
FIGS. 3 and 4 show illustrative logical operations performed by the resource server of FIG. 2.

The illustrative logical operations of FIG. 3 begin at invitation operation 302 where the owner of the resource 114 generates an invitation through the resource server 112 to the guest user to invite the guest user to access the resource 114. The resource server 112 may provide an invitation tool that allows the owner of the resource to specify through the client computer of the owner the permissions that the guest user should have and the identifier, such as the email address, known for the guest user. The resources server 112 then detects whether the guest user already has an authentication account at query operation 304. This may be done by communicating with the authentication ID server 108 to determine whether an account with the known identifier is on record at the authentication ID server 108.

If query operation 304 detects that the guest user already has an authentication account, then the guest user's authentication ID is obtained from the authentication ID server 108 at ID operation 306. The resource server 112 then stores the authentication ID with the permissions assigned by the owner in the access list at store operation 308. The guest user can now access the resource upon being authenticated with the authentication ID since authorization to access the resource has been established in the access list for the authentication ID. An email or other form of communication may be used to inform the guest user of the invitation and the email may contain a hyperlink that the user may select to access the resource.

If query operation 304 detects that the guest user does not have an authentication ID because the authentication ID server 108 found no account for the known identifier known for the guest user, then operational flow transitions to store operation 310. At store operation 310, the known identifier of the guest user is stored in a placeholder within the access list. The permissions provided by the owner of the resource when inviting the guest user may now be stored in the placeholder to preliminarily specify the authorization for the guest user. Also, a null authentication ID value may be stored in the placeholder, and this null value will be replaced with an actual authentication ID value after the guest user obtains one.

After generating the placeholder with the known identifier of the guest user, the resource server 112 sends an instructional email or other message type to the email address or other identifier known for the guest user at email operation 312. The email or other message type may contain textual instructions for the guest user that instruct the guest user to obtain an authentication ID using a known identifier such as the email address where the message was sent as the email address for the authentication ID account. A hyperlink to the authentication ID server 108 may be provided in the email. Furthermore, the email may contain an instruction to the guest user informing the guest user to attempt to access the network resource after creating the authentication ID account with the known identifier. A hyperlink to the resource server 112 may be provided in the email to allow the guest user to attempt to access the resource by selecting the link.

As an alternative to or in addition to sending an email or other message type from the resource server 112 to the guest user, other forms of communication may be utilized to instruct the guest user to obtain the authentication ID for the known identifier. For example, an automated telephone call or a telephone call from the resource owner who generated the invitation to the guest user may be performed if a telephone number is available. As another example, the resource owner may generate an email to the guest user at the known email address to instruct the guest user.

After sending the email or other message type to the guest user, the resource server 112 awaits a response from the guest user. At receive operation 314, the resource server 112 receives the attempt by the guest user to access the resource wherein the client computer 102 of the guest user is directed to the network location of the resource server 112. At this point, the resource server 112 will attempt to authenticate the guest user by accessing a cookie from the client computer 102 of the guest user. However, upon this initial attempt, the guest user may not have logged in with the authentication ID server 108 and does not yet have a cookie with an authentication ID for the resource server 112.

When the client computer 102 of the guest user does not yet have the cookie with the authentication ID, the resource server 112 points the client computer 102 of the guest user to the authentication ID server 108 at redirect operation 316 so that the guest user will be directed to log in. The resource server 112 then awaits the log in of the guest user and the redirection of the client computer 102 of the guest user back to the resource server 112. At log in, the client computer 102 of the guest user receives a cookie once the guest user has been authenticated. Upon the client computer 102 being redirected back to the resource server 112 from the authentication ID server 108, the resource server 112 then accesses the cookie that has been provided to the client computer 102 of the guest user by the authentication ID server 108.

Upon the resource server 112 receiving the cookie containing an authentication 1D from the client computer 102, the resource server 112 detects whether the authentication account of the guest user has been verified at query operation 318. The resource server 112 communicates with the authentication ID server 108 to determine that the guest user has verified the account associated with the known identifier. As discussed below with reference to FIG. 5, the guest user is asked to verify the account by replying to an email sent or other message type to the guest user from the authentication ID server 108. This verification ensures that the guest user owning the email address or other identifier did in fact create the account and not someone else wishing to impersonate the guest user.

If query operation 318 detects that the authentication account has not been verified, then the resource server 112 denies storage of the authentication ID in the access list at deny operations 320. Also, the resources server 112 denies access to the resource for the guest user. This prevents someone who is attempting to impersonate the invited guest user from gaining unintended access to the resource, such as where the impersonator intercepted the invitation and obtained an account with the email address or other known identifier. However, the impersonator is not able to verify the account since the impersonator does not actually receive email or other message type at the email address or other identifier of the intended invitee.

If query operation 318 detects that the authentication account has been verified, then the resource server 112 detects whether the sign-in name used for the account of the guest user is shared at query operation 322. The sign-in name is the known identifier that the guest user provides to the authentication ID server 108 to log in and be authenticated, and the guest user may elect whether or not to share the sign-in name when setting up the account with the authentication ID server 108. If the sign-in name is shared, then the resource server 112 is able to obtain the sign-in name from the cookie that has been obtained from the client computer 102 of the guest user and operational flow transitions to query operation 326. If the sign-in name is not shared, then the resource server 112 provides a web form for display at the client computer 102 of the guest user at form operation 324. The web form requests entry of the sign-in name by the user, and the resource server 112 then obtains the entered sign-in name. Operational flow then proceeds to query operation 326.

Figure 4:
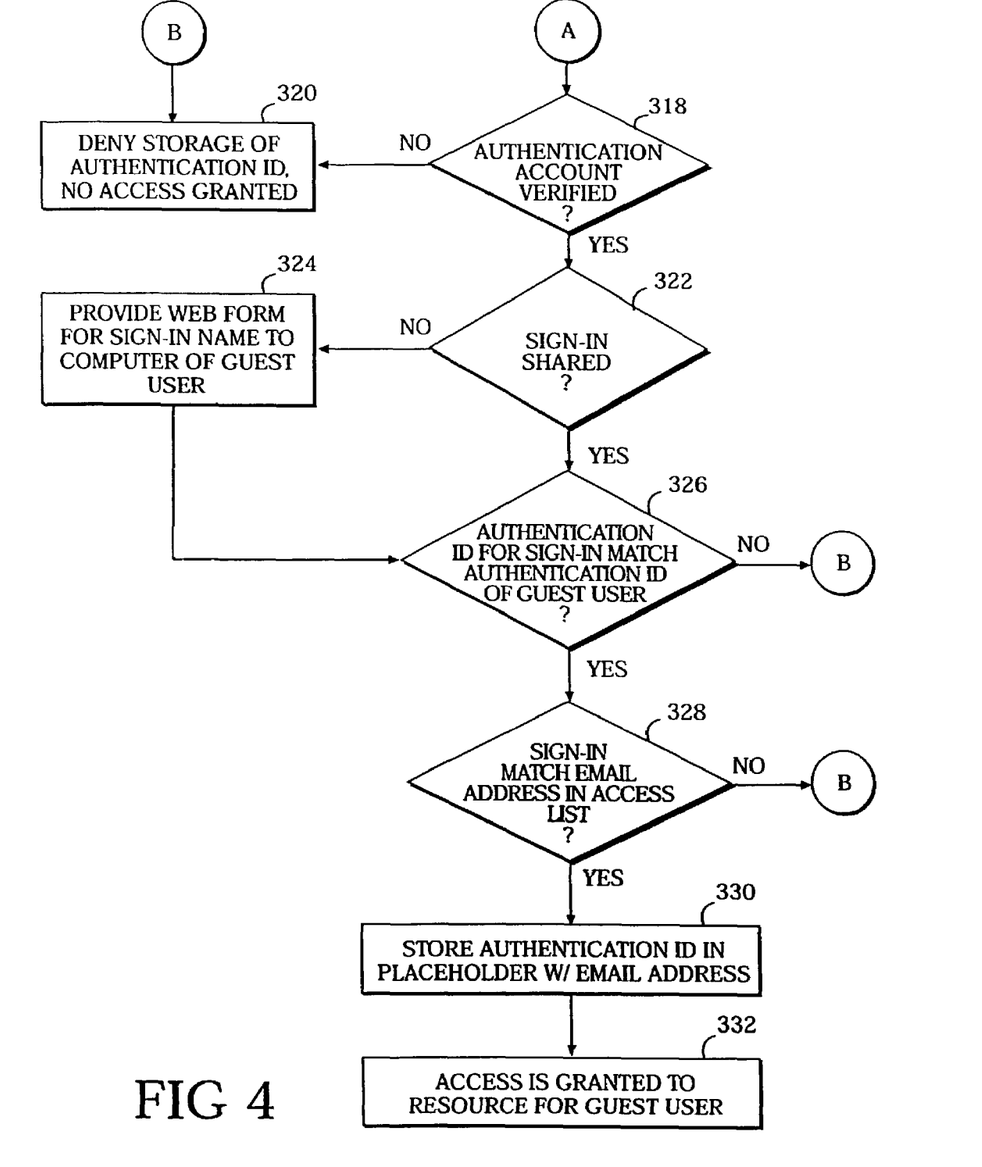

At query operation 326, the resource server 112 detects whether the authentication ID for the sign-in name matches the authentication ID in the cookie obtained from the client computer 102 of the guest user to make sure the cookie was actually provided to this user by the authentication ID server 108. The authentication ID for the sign-in name is obtained by communicating with the authentication ID server 108 to obtain the authentication ID that is stored for the sign-in name received through the cookie or web form. If the authentication ID from the authentication ID server 108 does not match the authentication ID from the client computer 102, then the resource computer 112 may deny storage of the authentication ID from the guest user and deny access to the resource at deny operation 320. Additionally or alternatively, the resource server 112 may provide the web form at form operation 324 to allow the guest user to reenter the sign-in name to be used to find an authentication ID from the authentication ID server 108.

Once query operation 326 detects that an authentication ID for the sign-in name from the authentication ID server 108 matches the authentication ID obtained from the client computer 102 of the guest user, then operational flow transitions to query operation 328. Query operation 328 detects whether the sign-in name previously received and used to find the matching authentication ID matches an identifier that has been stored in the access list. If not, then this indicates that no one has invited this guest user with this known identifier to access the resource. Therefore, the resource server 112 denies storage of the authentication ID of this guest user and denies access to the resource at deny operation 320.

When the sign-in name does match a known identifier within the access list, then the authentication ID for this guest user is stored in place of the null value in the placeholder containing the known identifier at store operation 330. Then, the resource server 112 grants access to the resource for this guest user at access operation 332. Upon subsequent attempts to access the resource, the cookie of the guest user will be obtained and the authentication ID value of the cookie will be compared to authentication IDs stored by the resource server 112 to authenticate the user. Then, the authentication ID will be used to find permissions for the user in the access list to determine which resources the user may access.

Figure 5:
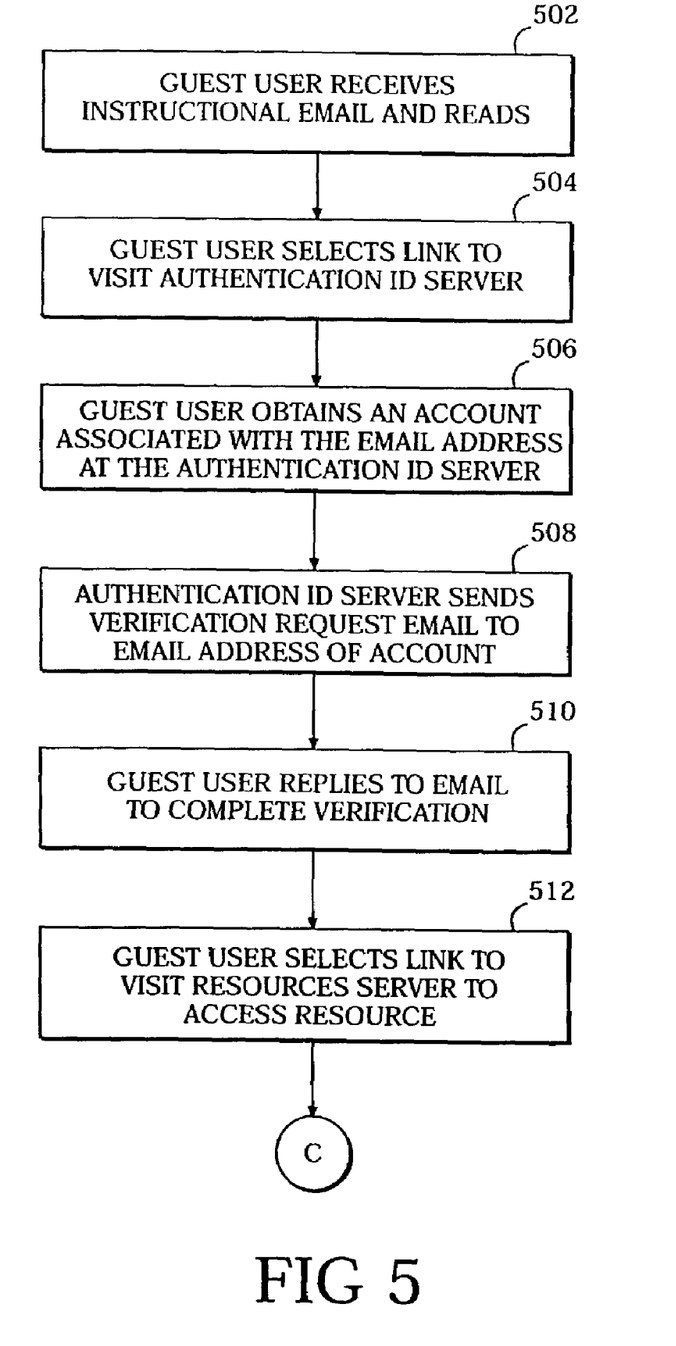
FIGS. 5 and 6 show illustrative logical operations that occur to establish interaction between the client computer, authentication ID server, and resource server of FIG. 1 in relation to the logical operations of FIGS. 3 and 4.
Figure 6:
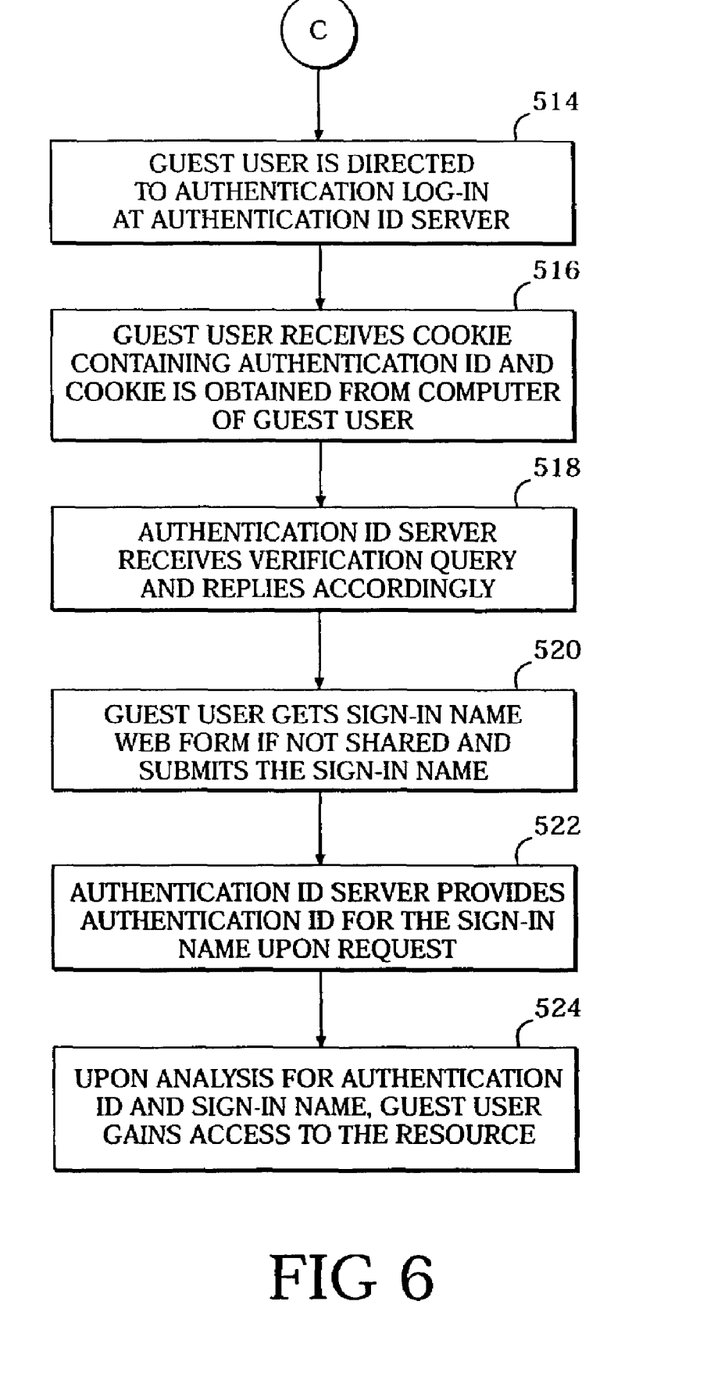

The illustrative logical operations shown in FIGS. 5 and 6 provide the interaction between the client computer 102 of the guest user, the authentication ID server 108, and the logical operations of FIGS. 3 and 4 being implemented by the resource server 112. These logical operations providing the interaction begin at receive operation 502 where the client computer 102 of the guest user receives the instructional email or other message type indicating that the authentication ID should be obtained to access the resource. The guest user responds by selecting the link in the email to visit the authentication ID server 108 at link operation 504.

Upon selecting the link, the guest user obtains an account with the authentication ID server 108 at account operation 506. The account is established with the sign-in name being the email address of the email or known identifier of other message type sent by the resource server 112 to the guest user. The authentication ID server 108 then sends a verification email or other message type to the email address or other known identifier of the account that requests that the guest user reply to the email or other message type to verify obtaining the account for which authentication IDs will be provided at email operation 508.

To verify the account, the guest user upon receiving the email or other message type from the authentication ID server 108 then replies at reply operation 510. After verifying the account by replying to the email or other message type, the guest user then selects the link to the resource that is included in the email or other message type from the resource server 112 at link operation 512. Upon selecting the link to visit the resource server 112, the client computer 102 of the guest user is directed to the authentication log in of the authentication ID server 108 at redirect operation 514. At this point the guest user obtains a current log in cookie.

Once the guest user has logged in with the authentication ID server 108, the client computer 102 of the guest user receives the cookie containing the authentication ID at cookie operation 516. Also, at this point the cookie is obtained from the client computer 102 by the resource server 112 as the client computer 102 of the guest user is redirected back to the resource server 112. The authentication ID server 108 then receives the verification query from the resource server 112 at receive operation 518. The authentication ID server 108 responds by informing the resource server 112 that the guest user has verified the account if the guest user replied to the verification email or message.

At this point, the guest user may receive at the client computer 102 the web form requesting sign-in from the resource server 112 at receive sign-in operation 520. This occurs if the guest user did not elect to share the sign-in name through cookies when setting up the account with the authentication ID server 108. The guest user fills in the sign-in form and submits it to the resource server 112.

After the resource server 112 obtains the sign-in name from the web form or cookie, the authentication ID server 108 receives a request for the authentication ID for the sign-in name from the resource server 112 at request operation 522. The authentication ID server 108 then returns the authentication ID for the sign-in name to the resource server 112. After the resource server 112 analyzes the authentication ID and sign-in name as discussed above for FIG. 4, the guest user obtains access to the network resource at access operation 524.

While the invention has been particularly shown and described with reference to illustrative embodiments thereof, it will be understood by those skilled in the art that various other changes in the form and details may be made therein without departing from the spirit and scope of the invention.

What is claimed is:

1. A method of sharing a network resource with a user not currently having access to the network resource, comprising:
   generating a placeholder in an access list for the network resource, wherein the placeholder contains a known identifier;
   communicating instructions to a computer of the user, wherein the instructions include instructions to obtain, from an authentication identifier server, an authentication identifier associated with the known identifier;
   obtaining, at the computer of the user, the authentication identifier associated with the known identifier from the authentication identifier server in response to receiving the instruction;
   obtaining the authentication identifier associated with the known identifier from the computer of the user upon an attempt to access the network resource;
   storing a copy of the authentication identifier obtained from the computer of the user in the placeholder that contains the known identifier within the access list;
   granting the computer of the user access to the network resource upon storing the copy of the authentication identifier; and
   upon a subsequent attempt to access the network resource, obtaining the authentication identifier from the computer of the user and comparing the authentication identifier obtained from the computer of the user to the authentication identifier stored in the access list to grant the computer of the user access to the network resource.

2. The method of claim 1, wherein communicating instructions to the computer of the user comprises sending an email to an email address of the user.

3. The method of claim 2, wherein the email includes a link to the authentication identification server and wherein the network resource is accessed by activating the link.

4. The method of claim 2, wherein the email includes a link to the network resource.

5. The method of claim 1, wherein obtaining the authentication identifier from the authentication identifier server comprises:
- accessing the authentication identifier server with the computer of the user; and
- sending the authentication identifier from the authentication identifier server to the computer of the user.

6. The method of claim 1, further comprising:
- sending an email from the authentication identifier server to the user to request verification of obtaining the authentication identifier;
- replying at the computer of the user to the email from the authentication identifier server to verify obtaining the authentication identifier;
- upon receiving the request to access the network resource from the computer of the user, contacting the authentication identifier server to determine whether the authentication identifier is verified;
- when the authentication identifier is verified, then storing the authentication identifier in the access list; and
- when the authentication identifier is not verified, then denying storage of the authentication identifier in the access list.

7. The method of claim 1, further comprising:
- assigning permissions for the network resource for the user within the access list at the placeholder associated with the known identifier prior to storing the authentication identifier in the placeholder.

8. The method of claim 1, further comprising directing the computer of the user to log in with the authentication identifier server to obtain the authentication identifier when attempting to access the network resource.

9. The method of claim 1, further comprising:
- obtaining the known identifier associated with the authentication identifier of the computer of the user attempting to access the network resource;
- obtaining the authentication identifier that the authentication identifier server associated with the obtained known identifier;
- comparing the authentication identifier that the authentication identifier server associated with the obtained known identifier to the authentication identifier obtained from the computer of the user attempting to access the network resource; and
- when the authentication identifier that the authentication identifier server associated with the obtained known identifier matches the authentication identifier obtained from the computer of the user, then storing the copy of the authentication identifier in the placeholder containing the known identifier.

10. The method of claim 9, wherein obtaining the known identifier associated with the authentication identifier of the computer of the user attempting to access the network resource comprises:
- providing a web form to the computer of the user that requests entry of the known identifier associated with the authentication identifier; and
- receiving the known identifier input at the web form.

11. The method of claim 1, further comprising:
- obtaining the known identifier associated with the authentication identifier of the computer of the user attempting to access the network resource;
- comparing the known identifier associated with the authentication identifier of the computer of the user attempting to access the network resource with the known identifier stored in the placeholder; and
- when the known identifier associated with the authentication identifier of the computer of the user attempting to access the network resource matches the known identifier stored in the placeholder, then storing the copy of the authentication identifier in the placeholder for the known identifier.

12. A computer system for sharing a network resource with a user not currently having access to the network resource, comprising:
- storage containing an access list for the network resource;
- a network interface; and
- a processing device configured to generate a placeholder within the network resource that contains the known identifier, generate a message through the network interface to the user instructing the user to obtain an authentication identifier from an authentication identifier server, store to a computer of the user the authentication identifier, obtain the authentication identifier through the network interface from the computer of the user, obtained from the authentication identifier server, upon attempting to access the network resource, store a copy of the authentication identifier obtained from the computer of the user in the placeholder containing the known identifier within the storage, grant the computer of the user access to the network resource upon storing the copy of the authentication identifier and upon a subsequent attempt by the computer of the user to access the network resource, obtain the authentication identifier from the computer of the user and compare the authentication identifier obtained from the computer of the user to the authentication identifier stored in the access list to grant access to the network resource.

13. The computer system of claim 12, wherein the generated message is an email that includes a link to the authentication identifier server and a link to the network resource.

14. The computer system of claim 12, wherein the processing device is further configured to, upon receiving the request to access the network resource, contact the authentication identifier server to determine whether the authentication identifier is verified, and when the authentication identifier is not verified, then deny storage of the authentication identifier in the placeholder.

15. The computer system of claim 12, wherein the processing device is further configured to receive an assignment of permissions to the network resource for the computer of the user and store the permissions to the network resource in the placeholder for the known identifier within the access list prior to storing the authentication identifier in the placeholder.

16. The computer system of claim 12, wherein the processing device is further configured to direct the computer of the user to log in with the authentication identifier server to obtain the authentication identifier upon receiving the attempt to access the network resource.

17. The computer system of claim 12, wherein the processing device is further configured to obtain the known identifier associated with the authentication identifier of the computer of the user attempting to access the network resource, obtain the authentication identifier that the authentication identifier server associates with the obtained known identifier, compare the authentication identifier that the authentication identifier server associates with the obtained known identifier to the authentication identifier obtained from the computer of the user attempting to access the network resource, and deny storing the authentication identifier in the placeholder when the authentication identifier that the authentication identifier server associates with the obtained known identifier does not match the authentication identifier obtained from the computer of the user.

18. The computer system of claim 12, wherein the processing device is further configured to provide through the network interface a web form from storage that requests entry of the known identifier associated with the authentication identifier and receive through the network interface the known identifier input at the web form.

19. The method of claim 12, wherein the processing device is further configured to obtain the known identifier associated with the authentication identifier of the computer of the user attempting to access the network resource, compare the known identifier associated with the authentication identifier of the computer of the user attempting to access the network resource with the known identifier stored in the placeholder, and when the known identifier associated with the authentication identifier of the computer of the user attempting to access the network resource does not match the known identifier stored in the placeholder, then deny storing the copy of the authentication identifier in the placeholder containing the known identifier.

20. A network system for sharing a network resource with a user not currently having access to the network resource, comprising:
a first server computer that provides the network resource and that maintains an access list providing permissions for the network resource, and wherein the first server generates a placeholder within the access list, stores a known identifier of the user in the placeholder, sends a message to the known identifier instructing the user to obtain an authentication identifier from an authentication identifier server, obtains the authentication identifier from a client computer, stores the authentication identifier obtained from the client computer within the placeholder containing the known identifier, grant the computer of the user access to the network resource upon storing the copy of the authentication identifier and upon a subsequent attempt by the computer of the user to access the network resource, obtain the authentication identifier from the computer of the user and compare the authentication identifier obtained from the computer of the user to the authentication identifier stored in the access list to grant access to the network resource; wherein
the client computer receives the message to the known identifier, obtains an authentication identifier associated with the known identifier from the authentication identifier server, and attempts to access the network resource at the first server after obtaining the authentication identifier.

21. The network system of claim 20, wherein the client computer replies to a message to the known identifier from the authentication identifier server to verify obtaining the authentication identifier and wherein prior to storing the authentication identifier, the first server contacts the authentication identifier server to determine whether the client computer verified obtaining the authentication identifier.

22. The network system of claim 20, wherein prior to storing the authentication identifier, the first server computer obtains the known identifier for the computer of the user and compares the authentication identifier of the computer of the user attempting to access the network resource to the authentication identifier obtained from the authentication identifier server for the known identifier.

23. The network system of claim 20, wherein prior to storing the authentication identifier, the first server computer obtains the known identifier for the computer of the user and compares the known identifier obtained from the computer of the user to the known identifier stored in the placeholder.

24. A computer readable storage medium comprising instructions that when executed by a computer perform the steps of:
generating a placeholder storing a known identifier of a computer of a user in storage;
communicating instructions to the computer of the user, wherein the computer of the user is instructed to access a network resource and obtain an authentication identifier from an authentication identifier server;
upon receiving an attempt by the computer of the user to access a network resource, detecting whether an authentication identifier being provided by the computer of the user has been verified with an authentication identifier server of the authentication identifier, comparing an authentication identifier of the authentication identifier server that is associated with the known identifier of the computer of the user with the authentication identifier being provided by the computer of the user, and comparing the known identifier of the computer of the user to the known identifier in the placeholder;
when the authentication identifier being provided by the computer of the user has been verified with the authentication identifier server and matches the authentication identifier of the authentication identifier server that is associated with the known identifier of the computer of the user, and when the known identifier of the computer of the user matches the known identifier in the placeholder, then storing the authentication identifier provided by the computer of the user in the placeholder;
granting the computer of the user access to the network resource upon storing the copy of the authentication identifier; and
upon a subsequent attempt to access the network resource, obtaining the authentication identifier from the computer of the user and comparing the authentication identifier obtained from the computer of the user to the authentication identifier stored in the placeholder to grant the computer of the user access to the network resource.

25. The computer readable storage medium of claim 24, wherein the known identifier is an email address and wherein the instructions when executed by the computer perform the additional steps of:
providing an email to the computer of the user at the email address that instructs the computer of the user to obtain the authentication identifier from the authentication identifier server, and wherein the email includes a link to the authentication identifier server and a link to the network resource.

26. The computer readable storage medium of claim 24, wherein the instructions when executed by the computer perform the additional steps of:
providing a web form to the computer of the user attempting to access the network resource that requests entry of the known identifier associated by the authentication identifier server with the authentication identifier; and
receiving the known identifier input by the computer of the user at the web form.

* * * * *